(12) United States Patent
Yoon et al.

(10) Patent No.: US 10,953,362 B2
(45) Date of Patent: Mar. 23, 2021

(54) APPARATUS FOR SEPARATING AMINE GAS FROM MIXED GAS

(71) Applicant: KOREA INSTITUTE OF ENERGY RESEARCH, Daejeon (KR)

(72) Inventors: Yeo-Il Yoon, Daejeon (KR); Il-Su Chun, Daejeon (KR); Soung Hee Yun, Gyeryong-si (KR); Jeong Ho Choi, Seoul (KR); Jin Young Jung, Busan (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 176 days.

(21) Appl. No.: 16/190,152

(22) Filed: Nov. 14, 2018

(65) Prior Publication Data

US 2019/0160423 A1 May 30, 2019

(30) Foreign Application Priority Data

Nov. 24, 2017 (KR) ........................ 10-2017-0158505

(51) Int. Cl.
  *B01D 53/04* (2006.01)
  *B01D 53/14* (2006.01)
  *B01D 53/18* (2006.01)

(52) U.S. Cl.
  CPC ......... *B01D 53/18* (2013.01); *B01D 53/0423* (2013.01); *B01D 53/1487* (2013.01); *B01D 53/1493* (2013.01); *B01D 53/0438* (2013.01); *B01D 2251/502* (2013.01); *B01D 2251/506* (2013.01); *B01D 2251/512* (2013.01); *B01D 2252/103* (2013.01); *B01D 2253/102* (2013.01); *B01D 2253/104* (2013.01); *B01D 2253/106* (2013.01); *B01D 2253/108* (2013.01);

(Continued)

(58) Field of Classification Search
CPC ............ B01D 53/0423; B01D 53/0438; B01D 53/1487; B01D 53/1493; B01D 53/18; B01D 53/1462; B01D 53/1475; B01D 2259/40088; B01D 2251/502; B01D 2251/506; B01D 2251/512; B01D 2251/103; B01D 2253/102; B01D 2253/204; B01D 2253/106; B01D 2253/108; B01D 2253/116; B01D 2253/25; B01D 2257/40; B01D 2257/70
USPC ...... 96/121, 126, 134, 243, 355, 357; 95/92; 423/235, 239.1, 239.2
See application file for complete search history.

(56) References Cited

U.S. PATENT DOCUMENTS 4,259,301 A * 3/1981 Say .................... B01D 53/1425
                                                      423/228
5,435,981 A * 7/1995 Ichiki ................. B01D 53/9481
                                                      423/239.1

(Continued)

FOREIGN PATENT DOCUMENTS

WO      2014082770 A1    6/2014

*Primary Examiner* — Frank M Lawrence, Jr.
(74) *Attorney, Agent, or Firm* — Cantor Colburn LLP (57) ABSTRACT

Disclosed is an apparatus for separating amine gas from mixed gas, the apparatus including: a washer column through which mixed the gas passes; and a main adsorber column through which the mixed gas passing through the washer column passes. According to the present invention, the apparatus can remove amine gas more effectively and increase the lifetime of an adsorbent by allowing the mixed gas including the amine gas to pass through the washer column and the adsorber column.

7 Claims, 5 Drawing Sheets

(52) U.S. Cl.
CPC .... *B01D 2253/116* (2013.01); *B01D 2253/25* (2013.01); *B01D 2257/40* (2013.01); *B01D 2257/70* (2013.01); *B01D 2259/40088* (2013.01)

(56) References Cited

U.S. PATENT DOCUMENTS

| | | | | |
|---|---|---|---|---|
| 6,784,320 | B2 * | 8/2004 | Mimura | B01D 53/1475 564/497 |
| 9,278,308 | B2 * | 3/2016 | Jamtvedt | B01D 53/18 |
| 2009/0320678 | A1 * | 12/2009 | Chang | B01D 46/521 95/92 |
| 2011/0283885 | A1 * | 11/2011 | Thiele | B01D 53/1475 95/199 |
| 2011/0308389 | A1 * | 12/2011 | Graff | B01D 53/1475 95/166 |
| 2012/0213683 | A1 * | 8/2012 | Kato | B01D 53/90 423/224 |
| 2014/0116251 | A1 * | 5/2014 | Bade | B01D 53/1475 95/156 |
| 2014/0241967 | A1 * | 8/2014 | Fujita | B01D 53/62 423/228 |
| 2018/0079660 | A1 * | 3/2018 | Widger | B01D 15/00 |

* cited by examiner

APPARATUS FOR SEPARATING AMINE GAS FROM MIXED GAS

CROSS REFERENCE TO RELATED APPLICATION

The present application claims priority to Korean Patent Application No. 10-2017-0158505, filed Nov. 24, 2017, the entire contents of which is incorporated herein for all purposes by this reference.

BACKGROUND OF THE INVENTION

Field of the Invention

The present invention relates to an apparatus for separating amine gas from mixed gas, the apparatus lowering a concentration of amine gas in mixed gas by passing the mixed gas through a washer column and an adsorber column.

Description of the Related Art

Carbon dioxide, one of the greenhouse gases, is included in mixed gas that mainly occurs in a process of burning fossil fuels, and is a major cause of global warming. For this reason, a carbon dioxide capture and storage technology has attracted attention for environmental protection and is used as a practical alternative in these days where fossil fuels are mainly used.

In a carbon dioxide capture process, an aqueous solution containing an amine compound, which is economical and most chemically compatible with bicarbonate ions ($HCO_3-$) in which carbon dioxide is dissolved in water, is mainly used. The carbon dioxide capture process is performed through an absorber column using a liquid absorbent primarily and a stripper column separating carbon dioxide from the absorbent containing captured carbon dioxide. In the absorber column, a flue gas in which 90% or more of carbon dioxide is removed, and a gas containing a small amount of amine gas and water vapor evaporated at a reaction temperature are discharged. In the stripper column, 99.9% or more of carbon dioxide, which is separated from the absorbent containing captured $CO_2$, and a small amount of evaporating amine gas and water vapor are discharged, and a remaining absorbent is regenerated in a regenerator column as an absorbent to contain an amine compound, whereby a highly purified carbon dioxide gas is obtained. Here, a small amount of amine gas discharged from the absorber column and the stripper column may cause various problems.

Amine gas may cause odor such as ammonia. In addition, amine gas is very harmful to the human body because amine gas discharged from the top of the absorber column reacts with nitrogen oxide (NO) existing in the flue gas and thus produces nitrosamines (RR'N—NO), which are mostly included in Group 1 carcinogens. When the high purity carbon dioxide discharged from the stripper column is converted chemically or biologically, directly used, or stored in a compression manner, a small amount of amine gas may react with carbon dioxide and thus produces carbamate salts (organic compounds including —NCOO—), which act as impurities. Thus, it is necessary to obtain as highly pure carbon dioxide as possible from the stripper column.

In recent days, the most used method to remove amine gas is to use only activated carbon as an adsorbent. However, adsorbing by only using the adsorbent lowers an adsorption rate, and when amine gas in mixed gas is removed through only the adsorber column, a lifetime of the adsorbent is reduced. Furthermore, the adsorbent itself is also harmful to the environment, whereby it is not suitable for mass use.

SUMMARY OF THE INVENTION

Accordingly, the present invention has been made keeping in mind the above problems occurring in the related art, and an objective of the present invention is to more effectively remove amine gas in mixed gas by consecutively passing the mixed gas through a washer column and an adsorber column.

Accordingly, another objective of the present invention is to increase efficiency and lifetime of an adsorbent by primarily removing amine gas in mixed gas through a washer column.

In order to accomplish the above objectives, according to an embodiment of the invention, there is provided an apparatus for separating amine gas from mixed gas, the apparatus including a washer column through which mixed the gas passes; and a main adsorber column through which the mixed gas passing through the washer column passes.

The washer column may be one of a spray column, a bubble column, a packed column, and a plate column.

The washer column may further include a demister at an upper end thereof. Alternatively, the washer column may further include a demister and a condenser at an upper end thereof.

A washing solution in the washer column may be water or an acid solution, and the acid solution may be one or more selected from the group consisting of sulfuric acid, hydrochloric acid, and phosphoric acid.

When the main adsorber column is saturated, the apparatus may further include a sub-adsorber column through which the mixed gas passing through the main adsorber column passes.

An adsorbent in the adsorber column may be one or more selected from the group consisting of zeolite, activated carbon, silica, alumina, a carbon molecular sieve, silicate, and activated alumina.

When the adsorber column is saturated, the adsorber column may further include a regeneration unit, which regenerates the adsorbent by applying heat to the inside of the adsorber column.

The apparatus may further include a reservoir recovering amine discharged from the washer column and supplying the recovered amine to a carbon dioxide capture facility for supplementing amine.

According to the present invention, mixed gas including amine gas passes a washer column and an adsorber column for purification whereby amine gas can be more effectively removed. Further, according to the present invention, after removing amine in a washer column, mixed gas goes to an adsorber column, whereby lifetime of an adsorbent can be increased.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinbelow, exemplary embodiments of the present invention will be described in detail with reference to the accompanying drawings.

Figure 1:
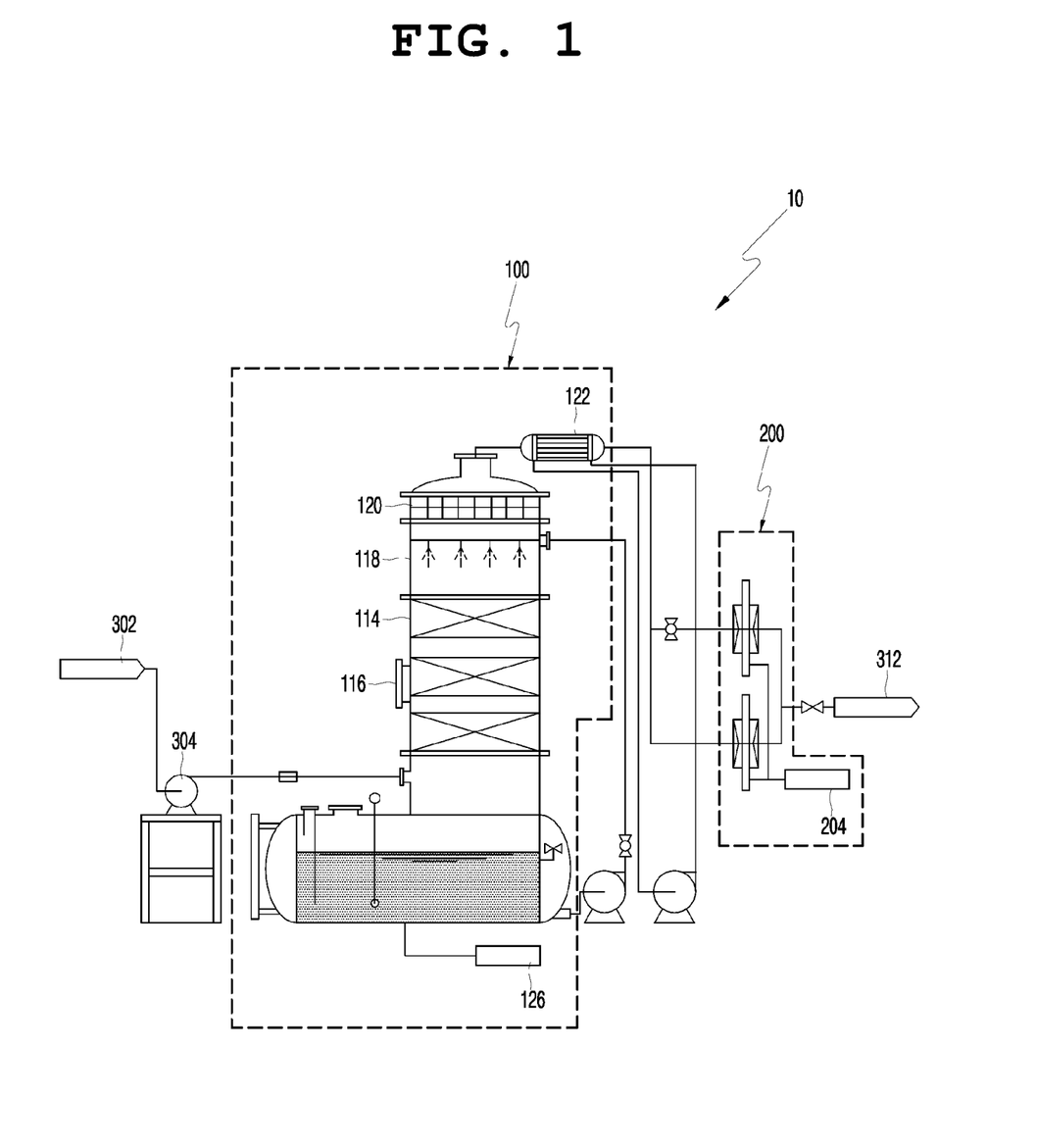
FIG. 1 is a schematic diagram illustrating a configuration of an apparatus for separating amine gas according to an embodiment of the present invention.

FIG. 1 is a schematic diagram illustrating a configuration of an apparatus 10 for separating amine gas according to an embodiment of the present invention. As shown in FIG. 1, the apparatus 10 for separating amine gas includes a washer column 100 through which mixed the gas passes and a main adsorber column 200 through which the mixed gas passing through the washer column 100 passes.

The apparatus 10 for separating amine gas is used to remove amine gas because an amine compound used in a carbon dioxide capture process or the like may be released in a small amount as amine gas. Since amine gas has odor, reacts with carbon dioxide in a stripper column and produces carbamate salts, which act as impurities, and is harmful to environment and the human body, it is necessary to remove amine gas.

The washer column 100 applies a principle of dissolving amine gas in a washing solution, and may include a washer portion 114, a manhole 116, and a distributer 118. Mixed gas 302 including amine gas is introduced into a lower left end of the washer column 100 and goes up to an upper end thereof. The washing solution inside the washer column 100 is circulated by a pump 304. The distributer 118 evenly discharges washing solution of the upper end of the washer column 100 to the lower end of the washer column 100 due to gravity. Amine ($RNH_2$) gas has a very high solubility in water, such that amine gas may become ammonia (NH3), which is water-soluble. Therefore, amine gas is removed by the distributed washing solution. When the mixed gas including the amine gas passes through the washer column 100, the amine gas is separated such that a concentration of amine gas ranges from about 20 ppm to about 2 ppm.

A spray column, a bubble column, a packed column, or a plate column may be used as the washer portion 114 of the washer column 100, and preferably, a packed column may be used as the washer portion 114. The spray column is a column in which water is distributed into amine gas to dissolve the amine gas. The bubble column is a column in which water is filled in the column and the mixed gas including the amine gas is distributed in a bubble state from a lower end of the column to pass through the water, thereby discharging purified gas to an upper portion of the column. The packed column is a column in which regular or irregular shaped filling materials are filled the column, and a liquid flows from an upper end thereof and the mixed gas including the amine gas is introduced from the lower end thereof to increase contact time as possible in order to remove amine. The plate top is a column in which a half-moon shaped porous plate is provided inside the column, and a dropping speed of a liquid distributed from an upper end thereof is delayed as possible to increase contact time with gas coming up from a lower portion thereof, thereby facilitating mass transfer.

The washer column 100 may further include a demister 120 at an upper end thereof. Moisture in steam contacts the demister 120 and is removed as condensation. The demister 120 may be multiple layers of filters. In the presence of water, liquefied amine reacts with carbon dioxide and thus produces carbamate salts. The salts cause fouling on a surface of an adsorbent, leading to deterioration of the performance of the adsorbent, which is installed at a downstream process in the main adsorber column 200, whereby it is necessary to remove the salts. The moisture-removed gas is sent to the main adsorber column 200.

A small condenser 122 may be installed at a rear end of the demister 120. By further providing the condenser 122 at the rear end, moisture can be more effectively removed.

The washing solution in the washer column 100 may be water or an acid solution, and the acid solution may be one or more selected from the group consisting of sulfuric acid, hydrochloric acid, and phosphoric acid. The acidic solution is preferably pH 2 to pH 6.

The main adsorber column 200 may further include a sub-adsorber column through which the mixed gas passing through the main adsorber column 200 passes when the main adsorber column 200 is saturated. In this case, one or more sub-adsorber columns may be provided, and preferably, two sub-adsorber columns are provided.

The amine gas that has not been removed from the main adsorber column 200 is removed through the sub-adsorber column.

Each adsorbent of the main adsorber column 200 and the sub-adsorber column may be one or more selected from the group consisting of zeolite, activated carbon, silica, alumina, a carbon molecular sieve, silicate, and activated alumina, and preferably, may be activated carbon. Specifically, among activated carbons, an activated carbon having a high specific surface area and a high metal ion content such as Ca and K is excellent in adsorbing amine gas. In addition, an activated carbon with a high ratio of mesopores (about 500 nm) is excellent in adsorbing amine gas.

A type of the adsorbent is not limited to the above materials, and any adsorbent having a molecular functional group capable of removing amine gas may be used.

The main adsorber column 200 and the sub-adsorber column may further include a regeneration unit 204, which regenerates the adsorbent by applying heat to the inside of the adsorber columns when the adsorber columns are saturated. In the main adsorber column 200 and the sub-adsorber column, the regeneration unit 204 heats the insides of the saturated absorber columns to regenerate the adsorbent. When heat is applied to the main adsorber column 200 and the sub-adsorber column, the adsorbent is regenerated because amine bonded to the adsorbent evaporates and is removed.

As shown in FIG. 1, the apparatus 10 for separating amine gas may further include a reservoir recovering amine separated from the washer column and supplying the recovered amine to a carbon dioxide capture facility for supplementing amine.

The apparatus 10 for separating amine gas may be used in connection with the carbon dioxide capture facility. In practice, since the mixed gas discharged after the carbon dioxide capture process includes amine gas. Accordingly, it is possible to remove a small amount of amine gas more completely by providing an additional amine gas removing unit at the last stage of the carbon dioxide capture process. As a result, a small amount of the amine gas is completely removed, so that highly purified $CO_2$ gas 312 can be captured.

Hereinafter, the present invention will be described in more detail with reference to measurements. It should be apparent to those skilled in the art that these measurements are for illustrating the present invention only and that the scope of the present invention is not construed as being limited by these measurements.

Measurement 1 Performance of Adsorbent (1) Types of Activated Carbon

In general, an adsorbed quantity tends to be proportional to the total specific surface area. However, an adsorbed quantity of NCGI 0408 was higher than that of SGA-100, even though a specific surface area of SGA-100 was 1611, which is higher than that of NCGI 0408. It was determined that this was caused by inorganic metals such as Ca and K contained in the adsorbent.

(2) Comparison of Adsorption Capacities of Activated Carbons, NBGI 0408 and NCGI 0408

Figure 2A:
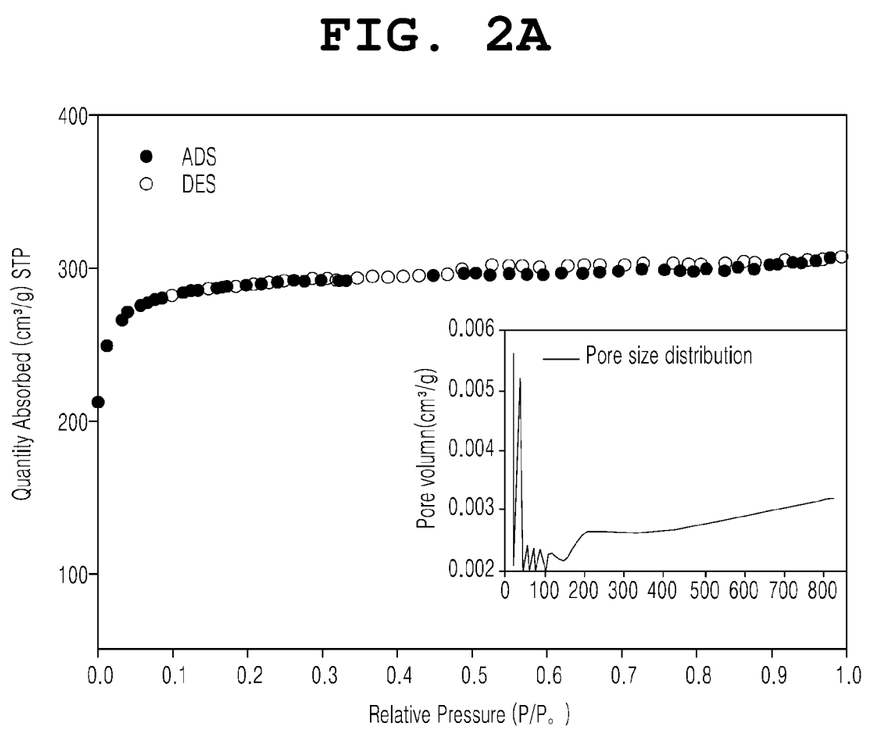
FIG. 2A is a graph illustrating an adsorption capacity of NBGI 0408, one of activated carbons, according to Measurement 1 of the present invention.
Figure 2B:
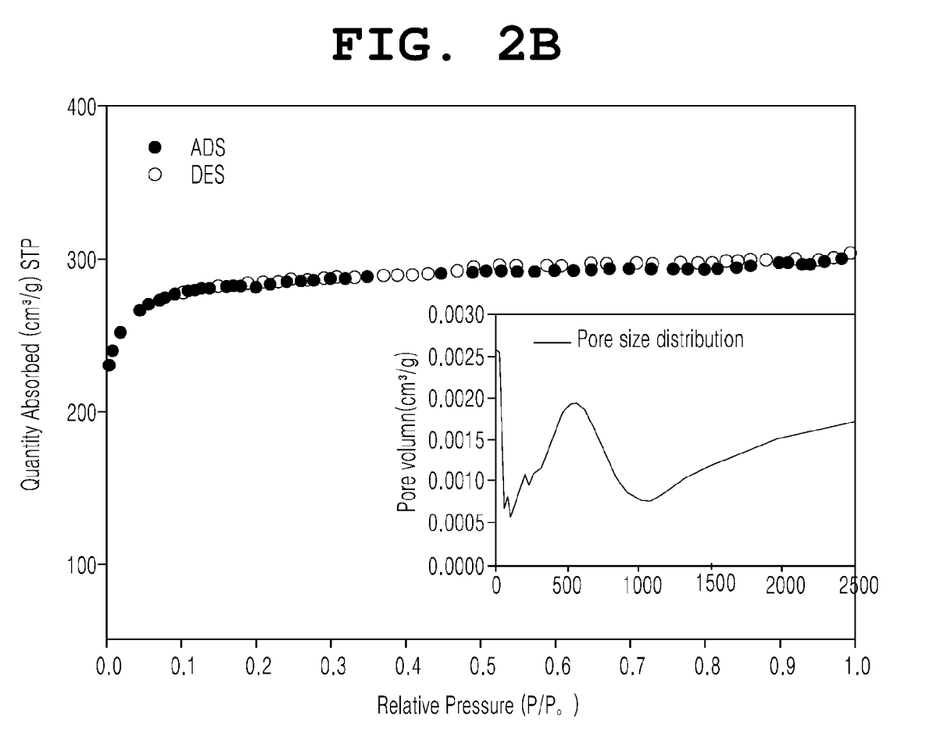
FIG. 2B is a graph illustrating an adsorption capacity of NCGI 0408, one of the activated carbons, according to the Measurement 1 of the present invention.

As shown in FIGS. 2A and 2B, both adsorbents, NBGI 0408 and NCGI 0408, exhibited a typical Langmuir Isotherm (type 1) model. NCGI 0408 showed pores of about 500 nm such that it was considered that mesopores of adsorbents increase amine adsorption capacity, in addition to those of Ca and K.

(3) Comparison of Adsorption Capacities of SGA-100 and SGP-100

Figure 3A:
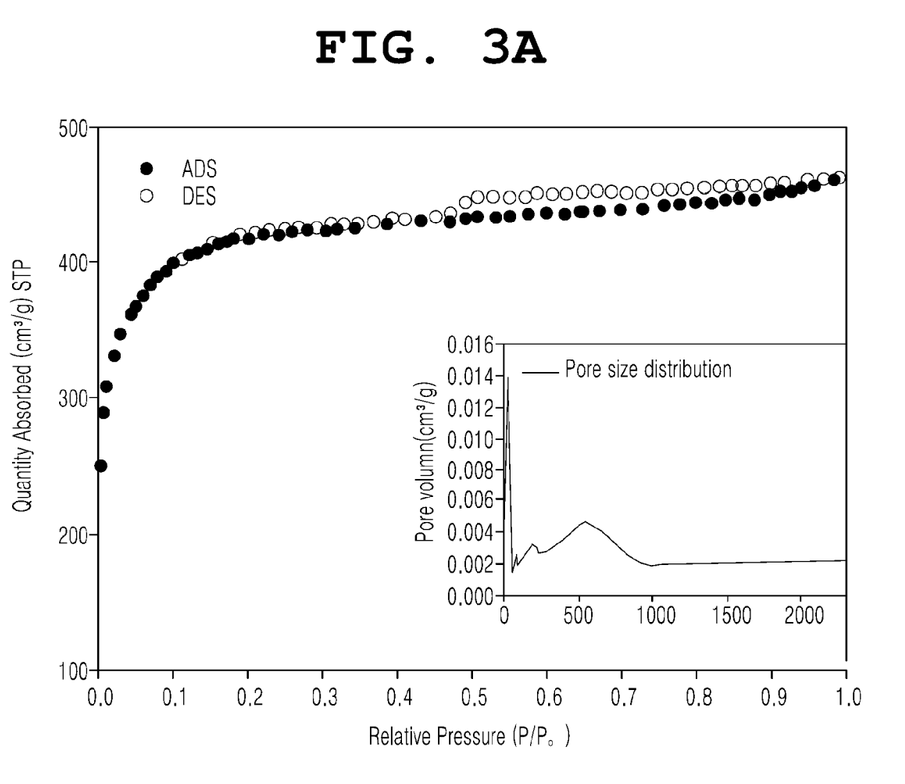
FIG. 3A is a graph illustrating an adsorption capacity of SGA-100, one of the activated carbons, according to the Measurement 1 of the present invention.
Figure 3B:
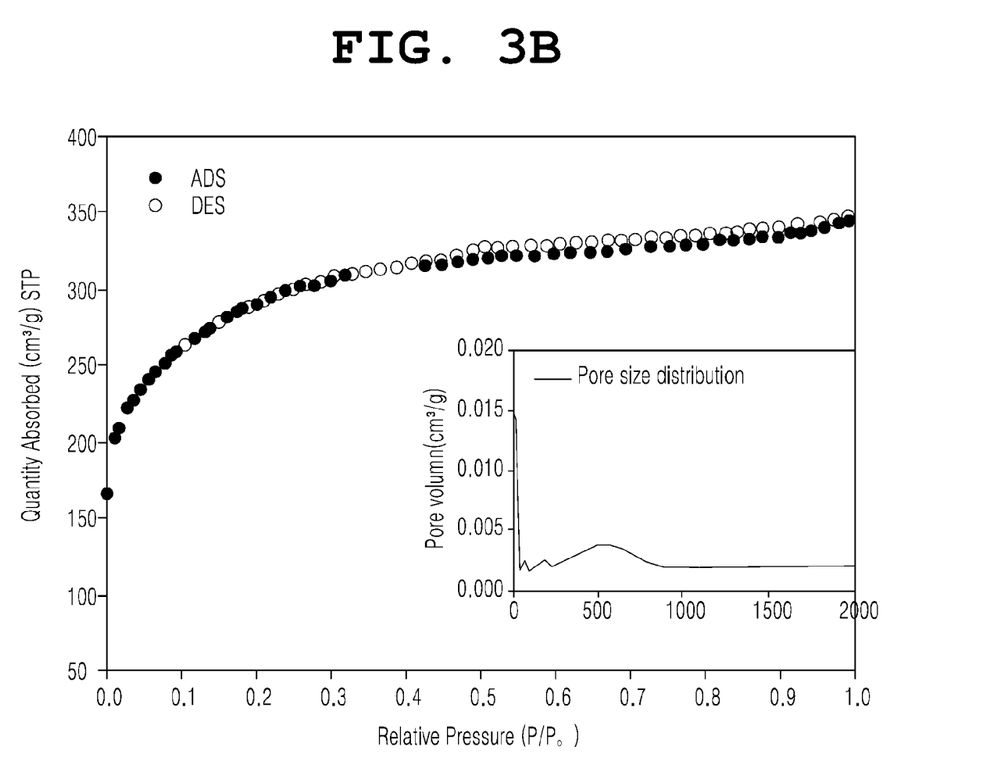
FIG. 3B is a graph illustrating an adsorption capacity of SGP-100, one of the activated carbons, according to the Measurement 1 of the present invention.

As shown in FIGS. 3A and 3B, in the result of adsorption abilities of SGA-100 and SGP-100, SGP-100 exhibited a Langmuir Isotherm (type 1) model, whereas SGA-100 exhibited Hysteresis (type 4) model. A Hysteresis curve is known to occur from adsorption of one or more layers, thus SGA-100 is considered to perform a multilayer adsorption. In addition, SGA-100 had a higher rate of forming mesopores of about 500 nm compared to SGP-100, which means that SGA-100 has a more excellent adsorption capacity compared to SGP-100.

(4) Based on the above analytical results of the adsorbents, it was found that the adsorption capacity of amine is high when the content of metal ions such as Ca and K is high and the specific surface area is large. In addition, the adsorption capacity of mesopores was higher when the rate of forming the mesopores was higher.

TABLE 1

| Name | Neven | | Samchully Activated Carbon | | Pusancarbon | | |
|---|---|---|---|---|---|---|---|
| | NBGI 0408 | NCGI 0408 | SGA-100 | SGP-100 | GAC-1000 | GAC-2000 | GAC-3000 |
| Type | Impregnated activated carbon | Impregnated activated carbon | Impregnated activated carbon | Impregnated activated carbon | Activated carbon | Activated carbon | Activated carbon |
| Mesh | 4 × 8 30 × 80 | 4 × 8 | 4 × 8 | 4.3~1.0 | | | |
| Moisture (%) | | | 5 max | 5 max | | | |
| Material | Coconut & Coal | Coconut & Coal | Coconut | Coal | Coal | Coal | Coal |
| Hardness (%) | >95 | >95 | 95 | 95 | | | |
| Bulk density (g/cc) | 0.40-0.45 | 0.40-0.45 | 0.40-0.43 | 0.40-0.50 | | | |
| Ash (%) | | | 5 max | 5 max | | | |
| Iodine adsorption (mg/g) | | | 1,100 | 950 | | | |
| pH | | | 9~11 | 8~10 | | | |
| Benzene adsorption (%) | | | 35 min | 30 min | | | |
| Specific surface area ($m^2/g$) | 1115.1733 | 1137.9366 | 1611.1539 | 1061.4750 | 1093.2118 | 1215.9602 | 1091.9706 |
| Application | Basic gases such as ammonia and trimethylamine can be removed excellently. Used for removing ocor from a manure treatment plant and for deodorization (for basic gas removal) | Basic gases such as ammonia and trimethylamine and acidic gases such as hydrogen sulfide and methanethiol can be removed at once. A multifunctional and economical effect can be realized such as improvement of filter performance, extension of replacement cycle, simplification of construction (for complex odor gas removal). | For air purification and odor removal | For solvent adsorption, air purification, and VOC removal | | | |

What is claimed is:

1. An apparatus for separating amine gas from mixed gas including the amine gas, the apparatus comprising:
   a washer column through which mixed the gas passes; and,
   a main adsorber column through which the mixed gas passing through the washer column passes,
   wherein the washer column further includes a demister and a condenser at an upper end thereof.

2. The apparatus of claim 1, wherein the washer column is one of a spray column, a bubble column, a packed column, and a plate column.

3. The apparatus of claim 1, wherein a washing solution in the washer column is water or an acid solution, and the acid solution is one or more selected from the group consisting of sulfuric acid, hydrochloric acid, and phosphoric acid.

4. The apparatus of claim 1, further comprising a sub-adsorber column through which the mixed gas passing through the main adsorber column passes when the main adsorber column is saturated.

5. The apparatus of claim 4, wherein an adsorbent in the adsorber column is one or more selected from the group consisting of zeolite, activated carbon, silica, alumina, a carbon molecular sieve, silicate, and activated alumina.

6. The apparatus of claim 4, wherein the adsorber column further includes a regeneration unit, which regenerates the adsorbent by applying heat to the inside of the adsorber column when the adsorber column is saturated.

7. The apparatus of claim 1, further comprising a reservoir recovering amine discharged from the washer column and supplying the recovered amine to a carbon dioxide capture facility for supplementing amine.

* * * * *